(12) United States Patent
Konik et al.

(10) Patent No.: US 10,114,826 B2
(45) Date of Patent: *Oct. 30, 2018

(54) AUTONOMIC REGULATION OF A VOLATILE DATABASE TABLE ATTRIBUTE

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/312,673

(22) Filed: Jun. 23, 2014

(65) Prior Publication Data

US 2015/0278276 A1  Oct. 1, 2015

Related U.S. Application Data

(63) Continuation of application No. 14/226,095, filed on Mar. 26, 2014.

(51) Int. Cl.
*G06F 17/30* (2006.01)

(52) U.S. Cl.
CPC .. *G06F 17/30076* (2013.01); *G06F 17/30079* (2013.01); *G06F 17/30091* (2013.01);
(Continued)

(58) Field of Classification Search
CPC ......... G06F 17/30339; G06F 17/30463; G06F 17/30076; G06F 17/30079; G06F 17/30091; G06F 17/30309; G06F 17/30383
See application file for complete search history.

(56) References Cited

U.S. PATENT DOCUMENTS 5,018,060 A   5/1991   Gelb et al.
5,758,345 A   5/1998   Wang
(Continued)

FOREIGN PATENT DOCUMENTS

WO   2013100936 A1   7/2013

OTHER PUBLICATIONS

Oracle, "Best Practices for Gathering Optimizer Statistics", Apr. 2012, pp. 1-22.*

(Continued)

*Primary Examiner* — Jared M Bibbee
(74) *Attorney, Agent, or Firm* — Roy W. Truelson

(57) ABSTRACT

A database table is monitored to automatically determine its volatility, and at least one volatility attribute expressing volatility state is saved. The volatility attribute is used to manage the database, e.g., to determine an optimum query execution strategy for a query involving data in the table, and/or for determining whether to re-optimize a previously saved query execution strategy and/or for managing storage and retrieval of table data. Preferably, parameters of the database table are captured at regular sampling intervals and a figure of merit representing volatility is computed from the parameter values. Preferably, the database supports the SQL database language, and the volatility attribute is or includes the SQL VOLATILE attribute. In an additional embodiment, the database manager may express volatility of a database table as a value within a range.

18 Claims, 7 Drawing Sheets

(52) U.S. Cl.
CPC .. *G06F 17/30309* (2013.01); *G06F 17/30339* (2013.01); *G06F 17/30383* (2013.01); *G06F 17/30463* (2013.01)

(56) References Cited

U.S. PATENT DOCUMENTS

| | | | |
|---|---|---|---|
| 6,061,692 A * | 5/2000 | Thomas | G06F 17/30362 707/613 |
| 6,101,541 A * | 8/2000 | Ellesson | H04L 12/24 709/202 |
| 7,177,855 B2 | 2/2007 | Witkowski et al. | |
| 7,212,997 B1 | 5/2007 | Pine et al. | |
| 7,761,403 B2 | 7/2010 | Witkowski et al. | |
| 8,386,463 B2 | 2/2013 | Bestgen et al. | |
| 8,396,769 B1 | 3/2013 | Selig et al. | |
| 8,515,863 B1 * | 8/2013 | Morejon | G06Q 40/02 705/38 |
| 8,700,602 B2 * | 4/2014 | Schapker | G06F 17/30306 707/713 |
| 8,745,633 B2 | 6/2014 | Jayaraman et al. | |
| 9,015,146 B2 | 4/2015 | Richards et al. | |
| 9,465,937 B1 | 10/2016 | Spiegel et al. | |
| 9,495,396 B2 * | 11/2016 | Ignacio | G06F 17/303 |
| 9,703,813 B2 | 7/2017 | Hegde et al. | |
| 2002/0120620 A1 | 8/2002 | Chan et al. | |
| 2002/0194337 A1 * | 12/2002 | Knight | G06F 21/6209 709/225 |
| 2002/0199075 A1 | 12/2002 | Jacobs | |
| 2003/0140207 A1 | 7/2003 | Nagase et al. | |
| 2005/0125452 A1 | 6/2005 | Ziauddin et al. | |
| 2005/0228964 A1 | 10/2005 | Sechrest et al. | |
| 2006/0167960 A1 | 7/2006 | Lomet | |
| 2008/0147448 A1 | 6/2008 | McLaughlin et al. | |
| 2008/0208820 A1 | 8/2008 | Usey et al. | |
| 2008/0215614 A1 | 9/2008 | Slattery | |
| 2008/0244008 A1 * | 10/2008 | Wilkinson | G06F 17/30545 709/205 |
| 2008/0256069 A1 | 10/2008 | Eder | |
| 2009/0055346 A1 | 2/2009 | Chijiiwa et al. | |
| 2009/0077135 A1 | 3/2009 | Yalamanchi et al. | |
| 2009/0240711 A1 | 9/2009 | Levin | |
| 2009/0271360 A1 * | 10/2009 | Bestgen | G06F 17/30463 |
| 2010/0153409 A1 | 6/2010 | Joshi et al. | |
| 2012/0072444 A1 * | 3/2012 | Sharp | G06F 3/0481 707/769 |
| 2012/0079174 A1 | 3/2012 | Nellans et al. | |
| 2012/0109985 A1 | 5/2012 | Chandrasekaran | |
| 2012/0150791 A1 | 6/2012 | Willson | |
| 2013/0036133 A1 | 2/2013 | Hogan et al. | |
| 2013/0073586 A1 | 3/2013 | Aubry et al. | |
| 2013/0144804 A1 | 6/2013 | Devaney et al. | |
| 2013/0144908 A1 | 6/2013 | Geroulo | |
| 2013/0166566 A1 | 6/2013 | Lemke et al. | |
| 2013/0211866 A1 | 8/2013 | Gordon et al. | |
| 2014/0229654 A1 | 8/2014 | Goss et al. | |
| 2014/0258316 A1 | 9/2014 | O'Hagan et al. | |
| 2014/0297369 A1 | 10/2014 | Vianello | |
| 2014/0297502 A1 | 10/2014 | Ianev et al. | |
| 2015/0019479 A1 | 1/2015 | Buehne et al. | |
| 2015/0058438 A1 | 2/2015 | Korangy et al. | |
| 2015/0088823 A1 * | 3/2015 | Chen | G06F 17/30578 707/626 |
| 2015/0088844 A1 | 3/2015 | Stigsen et al. | |
| 2015/0106578 A1 | 4/2015 | Warfield et al. | |

OTHER PUBLICATIONS

Oracle, "Best Practices for Gathering Optimizer Statistics with Oracle Database", Jun. 2013, pp. 1-26.*
Joseph M. Hellerstein, "Quantitative Data Cleaning for Large Databases", Feb. 27, 2008, pp. 1-42.*
Tsz-Chiu Au et al., "Reactive Query Policies: A Formalism for Planning with Volatile External Information", 2007, IEEE, pp. 243-250.*
Anonymous, "PostgreSQL, 8.3.23 Documentation Chapter 34, Extending SQL, 34.6 Function Volatility Categories", published on-line by the PostgreSQL Global Development Group at https://www.postgresql.org/docs/8.3/static/xfunc-volatility.html, 2013.

* cited by examiner

AUTONOMIC REGULATION OF A VOLATILE DATABASE TABLE ATTRIBUTE

CROSS-REFERENCE TO RELATED APPLICATION

This is a continuation of pending U.S. patent application Ser. No. 14/226,095, filed Mar. 26, 2014, entitled "Autonomic Regulation of a Volatile Database Table Attribute", which is herein incorporated by reference. This application claims priority under 35 U.S.C. § 120 of U.S. patent application Ser. No. 14/226,095.

FIELD OF THE INVENTION

The present invention relates to digital data processing, and in particular to the management of relational databases having volatile tables.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Modern computer systems may be used to support a variety of applications, but one common use is the maintenance of large relational databases, from which information may be obtained. Large relational databases usually support some form of database query for obtaining information which is extracted from selected database fields and records. Such queries can consume significant system resources, particularly processor resources, and the speed at which queries are performed can have a substantial influence on the overall system throughput.

Conceptually, a relational database may be viewed as one or more tables of information, each table having a large number of entries or records, also called "tuples" (analogous to rows of a table), each entry having multiple respective data fields (analogous to columns of the table) with a defined meaning. The function of a database query is to find all rows, for which the data in the columns of the row matches some set of parameters defined by the query. A query may be as simple as matching a single column field to a specified value, but is often far more complex, involving multiple field values and logical conditions. A query may also involve multiple tables (referred to as a "join" query), in which the query finds all sets of N rows, one row from each respective one of N tables joined by the query, where the data from the columns of the N rows matches some set of query parameters.

Execution of a query involves retrieving and examining records in the database according to some search strategy. For any given logical query, many different search strategies may be possible, all yielding the same logical result. But although all strategies yield the same logical result, not all search strategies are equal in terms of performance. Various factors may affect the choice of optimum search strategy and the time or resources required to execute the strategy. For example, query execution may be affected by the sequential order in which multiple conditions joined by a logical operator, such as AND or OR, are evaluated. The sequential order of evaluation is significant because the first evaluated condition is evaluated with respect to all the entries in a database table, but a later evaluated condition need only be evaluated with respect to some subset of records which were not eliminated from the determination earlier. Therefore, as a general rule, it is desirable to evaluate those conditions which are most selective first. Another factor may be the order in which records within a particular table are examined. Records in a table may be examined sequentially, sometimes known as a table scan, or may be examined according to an index value. Typically, a table scan examines more records, but an index scan requires, on the average, greater resource to examine each record. Query execution may be affected by any number of factors in addition to those described above.

To support database queries, large databases typically include a query engine which executes the queries according to some automatically selected search (execution) strategy, also known as a "plan", using the known characteristics of the database and other factors. Some large database applications further have query optimizers which construct search strategies, and save the query and its corresponding search strategy for reuse.

An optimal strategy for executing a query will depend not only on the conditions of the query itself, but on various characteristics of the database. For example, where multiple tables are being joined in a single query, the relative sizes of those tables may affect the optimal query execution strategy, it often being desirable to evaluate conditions related to smaller tables first. Query optimizers and query engines may use any of various metadata structures, such as histograms constructed by sampling data in one or more database tables, to estimate the characteristics of the database records and project the effects of alternative query execution strategies on query execution performance.

When a query optimizer constructs a query execution strategy, it may perform sophisticated analysis of multiple alternative query execution strategies, attempting to find an optimal strategy for a particular query. The resources expended in performing this analysis may exceed, and in some cases may far exceed, the resources required to execute the query. Optimization is often justified because a query is expected to be reused multiple times, so that the overhead of constructing and optimizing a query execution strategy is distributed among multiple execution instances.

Sometimes, a database table undergoes rapid and frequent changes in its character. For example, the number of records in the table may fluctuate dramatically, or the values of particular fields may undergo frequent, widespread changes. When this happens, it is difficult or impossible to predict the character of the database table at a particular time, and specifically, at a time when a query might be executed. If a query execution strategy is constructed and optimized based on certain assumptions about the character of the table using data gathered at one time, these assumption may no longer be true at the time that strategy is executed, resulting in poor execution performance.

Because it is known that a query execution strategy is optimized according to certain assumed characteristics of the database, some database managers are configured to automatically re-optimize a query if a database undergoes significant changes. For example, a query can be re-optimized if it references a database table which changes in size by more than a pre-determined threshold. However, if a table is of a type which undergoes rapid and frequent changes, this capability to re-optimize queries can exacerbate the performance problems, since the optimizer may be frequently re-optimizing the query strategy to keep up with the changes to the table.

SQL (Structured Query Language) is a standard, widely used special purpose language for managing data in a relational database system. SQL permits a database designer or other user to specify, through use of a "VOLATILE" attribute, that a particular table in the database is expected to undergo rapid and frequent changes. Database management software can use the VOLATILE attribute, if specified, to alter the way it optimizes queries relating to the subject table. For example, it might optimize according to a generic optimization which makes few or no assumptions about the character of the subject table, it might disable re-optimization based on changes made to the subject table, and/or it might prefer an index access over other types of access such as a table scan or hash scan. Additionally, database management software might disable the collection of certain statistical metadata regarding a volatile table, because collection of this data entails some overhead, and it would rapidly become stale.

Unfortunately, relatively few database users are aware of the VOLATILE attribute or understand its use. As a result, most database users leave the attribute in its default state (which is disabled or off, meaning that the subject table is not considered "volatile"). Although not generally known or understood in the industry, this behavior creates considerable inefficiency in the performance of many relational databases and considerable misuse of computing resources.

Therefore, a need exists, not necessarily generally recognized, for improved techniques for managing relational databases which contain one or more volatile tables.

SUMMARY

One or more parameters of a database table are automatically monitored over time to determine volatility state of the table. Volatility state is expressed as at least one saved volatility attribute, which could be a boolean value, a floating point value, or other form. The at least one volatility attribute is used by a database management application in managing the database.

In the preferred embodiment, certain parameters of the database table are captured at regular sampling intervals and a figure of merit representing volatility is computed from the parameters values. A boolean volatility attribute is derived from this figure of merit, although the figure of merit may also be considered a volatility attribute.

In the preferred embodiment, the database management application supports the SQL database language, and the volatility attribute is or includes the SQL VOLATILE attribute. Preferably, a function which automatically monitors tables of a database and determines whether any of the tables is volatile is integral to the database management application. Preferably, a user may manually designate a table VOLATILE, may manually designate a table not VOLATILE, or may specify that the database management application is to automatically determine whether the table is volatile, the last option being the default. Preferably, where the user specifies automatic determination of volatility, the volatility of the subject table is continually monitored over time, and can change from one state to another if sufficient stability or instability is shown.

In an additional embodiment, the database management application may express volatility of a database table as a value within a range which may assume any of more than two values (as opposed to simple boolean values 'volatile' and 'nonvolatile'). For example, volatility may be expressed as a floating point value, which could be normalized to a range between 0 and 1, with 0 representing lowest volatility and 1 representing highest. The query optimization decisions made database management software may then depend on this range of values.

A database manager may use volatility state in one or more of various ways. A query optimizer may use the volatility of a table to determine an optimum query execution strategy for a query involving data in the table. Alternatively, a database manager may take the volatility of a table into account when determining whether to re-optimize a previously saved query execution strategy as a result of cumulative changes to the data. Alternatively, the database manager may disable the collection and/or processing of certain metadata with respect to a volatile table. Alternatively, a database manager may take the volatility of a table into account when managing storage and retrieval of table data, for example by caching volatile table data, pinning volatile table data in memory and/or storing volatile table data in special storage areas or devices. Any additional technique, now known or hereafter developed, may be used. Such techniques could be used alone or in combination.

By automatically determining the volatility of a database table, reliance on users to manually and correctly specify table volatility is reduced, and certain volatile tables are recognized and treated as such. Such a capability can significantly improve the performance of certain databases.

The details of the present invention, both as to its structure and operation, can best be understood in reference to the accompanying drawings, in which like reference numerals refer to like parts, and in which:

DETAILED DESCRIPTION

Figure 1:
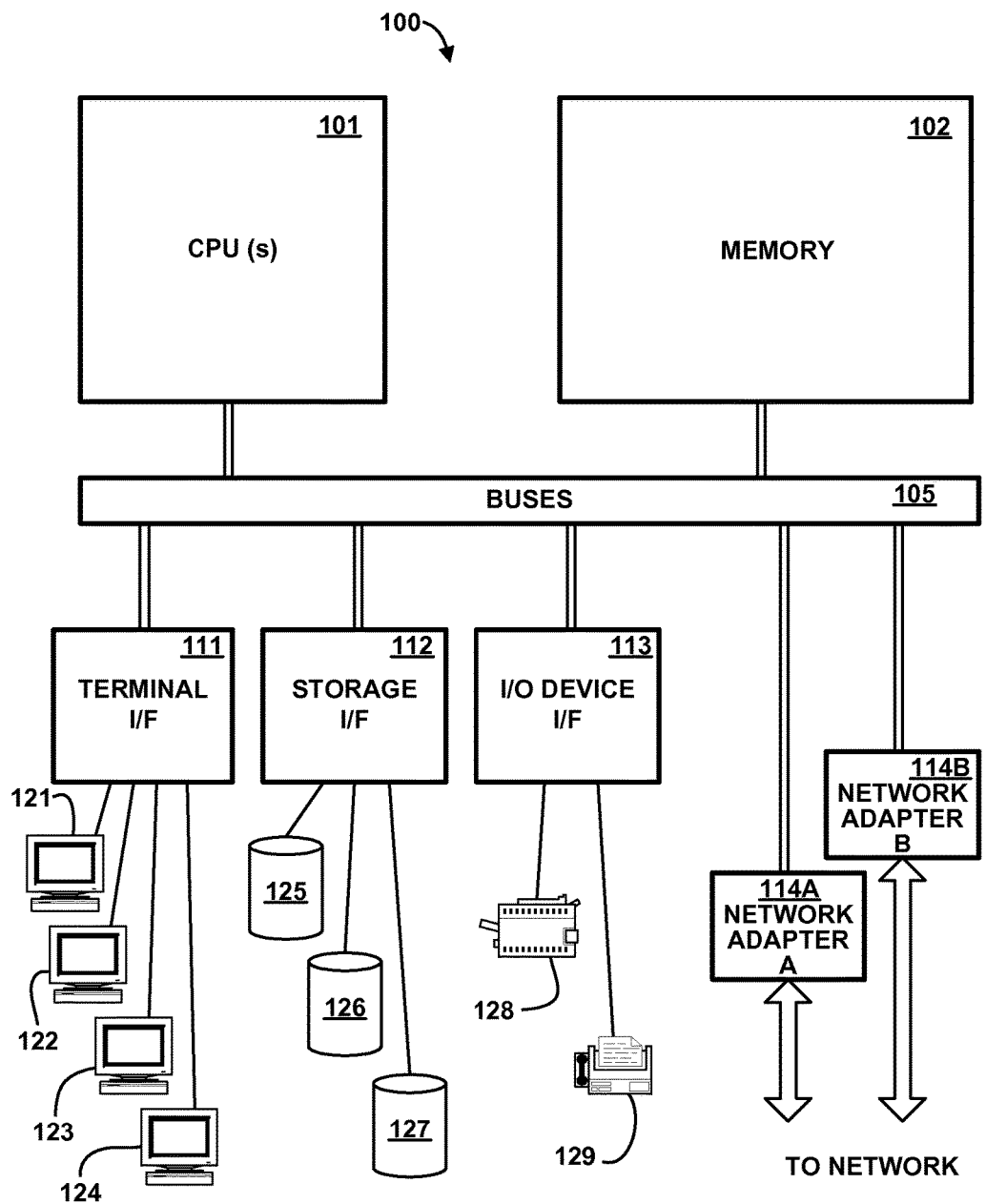
FIG. 1 is a high-level block diagram of the major hardware components of a computer system for use in managing a relational database, and automatically determining whether one or more tables of the database should be considered volatile, according to the preferred embodiment of the present invention.

Referring to the Drawing, wherein like numbers denote like parts throughout the several views, FIG. 1 is a high-level representation of the major hardware components of a computer system 100 for use in managing a relational database, and automatically determining whether one or more tables of the database should be considered volatile, according to the preferred embodiment of the present invention. CPU 101 is at least one general-purpose programmable processor which executes instructions and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface adapters 114A, 114B (herein generically referred to as feature 114) support connections to one or more external networks (not shown) for communication with one or more other digital devices. An external network may be any of various local or wide area networks known in the art. Network adapters 114 could support redundant connections to a single network, or could be coupled to separate networks, which may or may not be in communication with each other. While two network adapters 314 and network connections are shown, there may be only a single adapter and connection, or there could be more than two. Such external networks preferably include the Internet, and may include one or more intermediate networks, such as local area networks (not shown), through which communication with the Internet is effected.

It should be understood that FIG. 1 is intended to depict the representative major components of system 100 at a high level, that individual components may have greater complexity than represented in FIG. 1, that components other than or in addition to those shown in FIG. 1 may be present, that the number, type and configuration of such components may vary, and that a complex computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communications among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while certain functional elements of the invention herein are described for illustrative purposes as embodied in a single computer system, the present invention could alternatively be implemented using a distributed network of computer systems in communication with one another, in which different functions or steps described herein are performed on different computer systems. For example, the present invention could be implemented in a so-called cloud computing environment, in which multiple physical computer systems are available to perform work on behalf of multiple clients.

In the preferred embodiment, computer system 100 is a general purpose computer systems capable of being programmed to execute a variety of different functions by loading and executing appropriate software. The functions described herein are performed by appropriate executable software modules installed in the corresponding computer system or systems. However, system 100 could alternatively be or include one or more special-purpose digital data devices for accomplishing the corresponding functions described herein. For example, data in a relational database could be stored on one or more special-purpose data storage devices or servers, accessible to one or more computer systems.

While various system components have been described and shown at a high level, it should be understood that a typical computer system contains many other components not shown, which are not essential to an understanding of the present invention.

Figure 2:
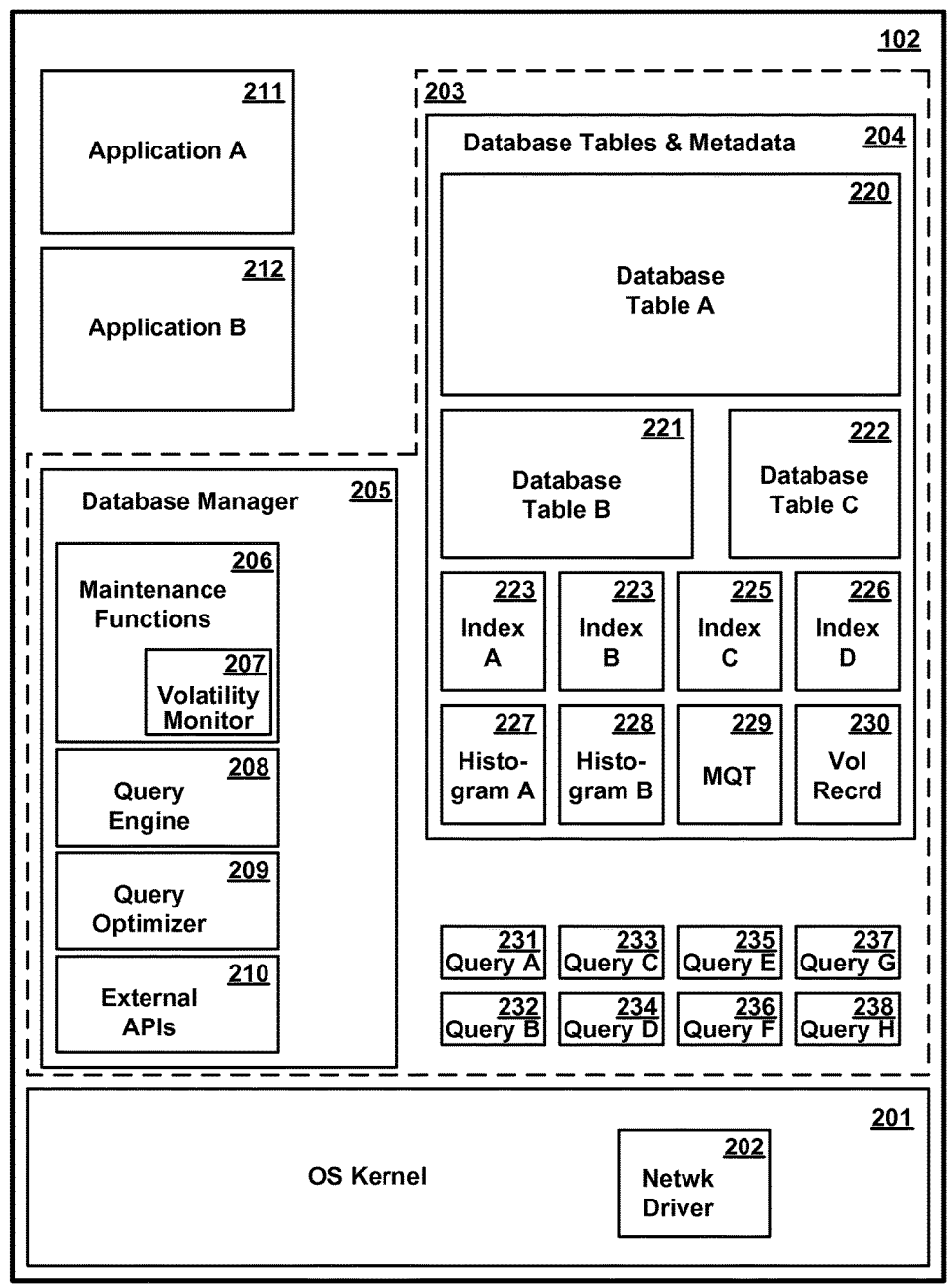
FIG. 2 is a conceptual illustration of the major software components of a computer system for managing a relational database, according to the preferred embodiment.

FIG. 2 is a conceptual illustration of the major software components of computer system 100 for managing a relational database in memory 102, according to the preferred embodiment. Operating system kernel 201 is executable code and state data providing various low-level software functions, such as device interfaces, management of memory pages, management and dispatching of multiple tasks, etc. as is well-known in the art. In particular, OS kernel 201 preferably includes one or more network adapter drivers 202 for handling communications with one or more networks via network adapters 114. A structured relational database 203 contains database tables and metadata 204 and database management software 205 for managing the data, for which computer system 100 provides access to one or more users, who may be directly attached to system 100 or may be remote clients who access system 100 through a network using a client/server access protocol. In the preferred embodiment, database 203 further contains one or more saved query objects 231-238. Additionally, one or more software application programs 211,212 execute various functions and access data in database 203 to perform useful work on behalf of respective one or more users.

Database tables and metadata 204 include one or more tables 220-222 (of which three are shown for illustrative purposes in FIG. 2, it being understood that the number may vary). As is known in the database art, a database table is a data structure logically in the form of a table having multiple records (also called entries or tuples), each record having at least one, and usually multiple, fields (also called attributes). The "rows" of the table correspond to the records, and the "columns" correspond to the fields. Although tables 220-222 are data structures which are logically equivalent to tables, they may be arranged in any suitable structure known in the database art. Database tables 220-222 might contain almost any type of data which is useful to users of a computer system.

Figure 3:
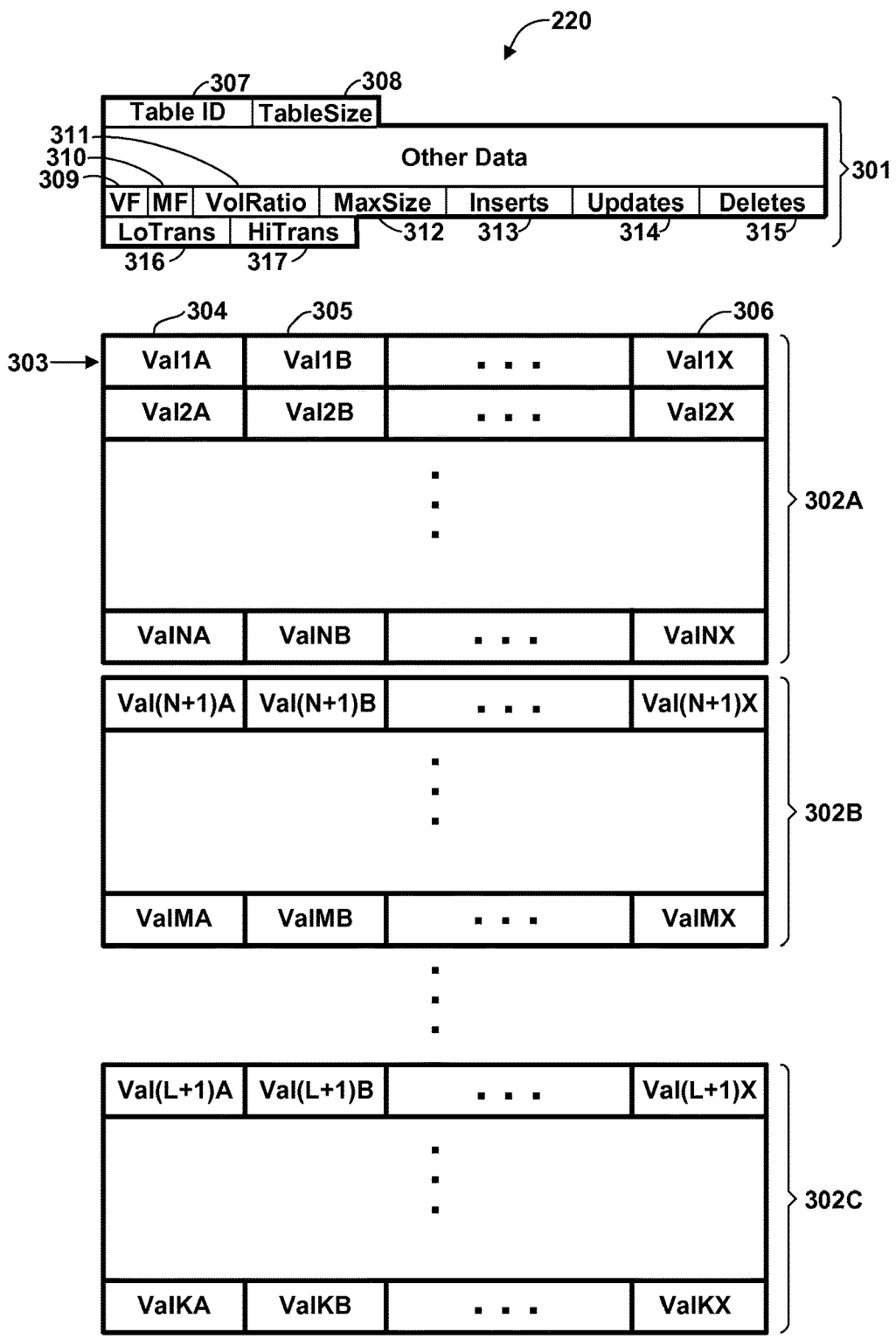
FIG. 3 is a conceptual representation of the structure of a database table, including header data, according to the preferred embodiment.

FIG. 3 is a conceptual representation of the structure of a database table 220, according to the preferred embodiment, it being understood that tables 221, 222 could have similar structure. Referring to FIG. 3, table 220 includes a header portion 301 and one or more table partitions 302A,302B, 302C (herein generically referred to as feature 302). Each table partition 302 contains multiple records 303 (also called rows, entries, or tuples), each record 303 containing multiple data values logically organized as multiple fields 304-306. A large database table will typically have multiple partitions 302, each partition containing a respective disjoint subset of the records of the database table as a whole, although smaller tables may have only a single partition. Each database table partition 302 is conceptually represented in FIG. 3 as a table or array, in which the rows represent database records, and the columns represent database fields. However, as is known in the art, the actual structure of the database table in memory typically varies due to the needs of memory organization accommodating database updates, and so forth. A database table will often occupy non-contiguous blocks of memory; database records may vary in length; some fields might be present in only a subset of the database records; and individual entries may be non-contiguous. Portions of the data may even be present on other computer systems.

Associated with database table 220 is header portion 301. Header 301 is in fact data separate from the collection of records 303, and may be considered part of the database table 220 or may be considered a separate data structure. The header may or may not be stored in locations contiguous to the records 303. Header contains data for identifying the contents of the table and, where it is located (e.g., pointers, arrays and other structures which identify the locations of the various partitions 302), certain essential parameters of the table, and so forth. In particular, in accordance with the preferred embodiment, header 301 contains a table identifier 307 and a current table size 308 (i.e., the number of record currently in table 220). Header further contains various data useful for monitoring and determining volatility of the table. These latter fields include a volatile flag 309, a manual set flag 310, a volatility ratio 311, a maximum table size 312, a number of inserts 313, a number of updates 314, a number of deletes 315, a low transition count 316, and a high transition count 317.

Volatile flag 309 is a boolean value indicating whether the table is considered volatile or non-volatile. In the preferred embodiment, volatile flag 309 is the value of the SQL 'VOLATILE' attribute. Manual set flag 310 is also a boolean value, indicating whether volatility state (as indicated by volatile flag 309 and/or volatility ratio 311) of a table will be set manually by a user or determined automatically by the database manager, as described herein. In the preferred embodiment, manual set is 'OFF' by default, indicating that the database manager automatically determines table volatility state. Volatility ratio 311 is preferably a non-negative floating point value indicating a degree of volatility of the subject table, computed as described herein. The storing of both the boolean volatile flag and the floating point volatility ratio allows different database management functions to use different values for different purposes. For example, since the SQL standard specifies only a boolean 'VOLATILE' attribute, the boolean volatile flag 309 is available for use by legacy functions which take this value as input. At the same time, where performance is particularly sensitive to table volatility, a function may be migrated to use the floating point volatility ratio in place of the simple boolean value for enhanced precision.

Volatility ratio 311 is periodically updated by sampling certain events during a sampling interval. Maximum table size 312 records the maximum number of records in database table 220 during a current sampling interval. Number of inserts 313, number of updates 314, and number of deletes 315 record the number of record insert operations, record update operations, and record delete operations, respectively, performed on the subject database table during the current sampling interval. Inserts 313, updates 314, and deletes 315 are simple counters which are incremented whenever the corresponding operation (insert, update or delete) is performed. Additionally, whenever an insert operation is performed, MaxSize 312 is compared with TableSize 308 after the insert, and if TableSize is greater than MaxSize, then MaxSize is set to the value of TableSize. As explained in further detail herein, both the volatile flag 309 (where determined automatically) and volatility ratio 311 are cumulative values which to some degree represent an averaging of historical data with the current interval data. Low transition count 316 and high transition count 317 are counts of the number of consecutive sampling intervals in which the volatility ratio was determined to be below or above a respective transition threshold; these values are used to regulate transitioning from a volatile to non-volatile table state (or vice-versa).

In an alternative embodiment, a separate update field (not shown) could be maintained for each field in the table to record the number of updates affecting the corresponding field. Such information could be used to weight updates to different fields differently when computing a volatility ratio. Furthermore, a separate volatility ratio could be maintained for each field based on the number of updates to the corresponding field. It would be possible to utilize such information to optimize or selectively re-optimize queries with respect to the subject field(s).

Associated with the database tables are one or more auxiliary data structures 223-230, also sometimes referred to as metadata (of which eight are represented in FIG. 2, it being understood that the number and type of such structures may vary). Auxiliary data structures characterize the structure of the database and data therein, and are useful in various tasks involved in database management, particularly in executing queries against the database. Examples of auxiliary data structures include database indexes 223-226, histograms 227-228, and materialized query table (MQT) 229, it being understood that other types of metadata may exist.

In particular, in accordance with one or more optional embodiments, metadata includes at least one volatility history record 230 which records historical information regarding selective attributes of one or more database tables, from which inferences of volatility may be drawn, as described in greater detail herein.

Figure 4:
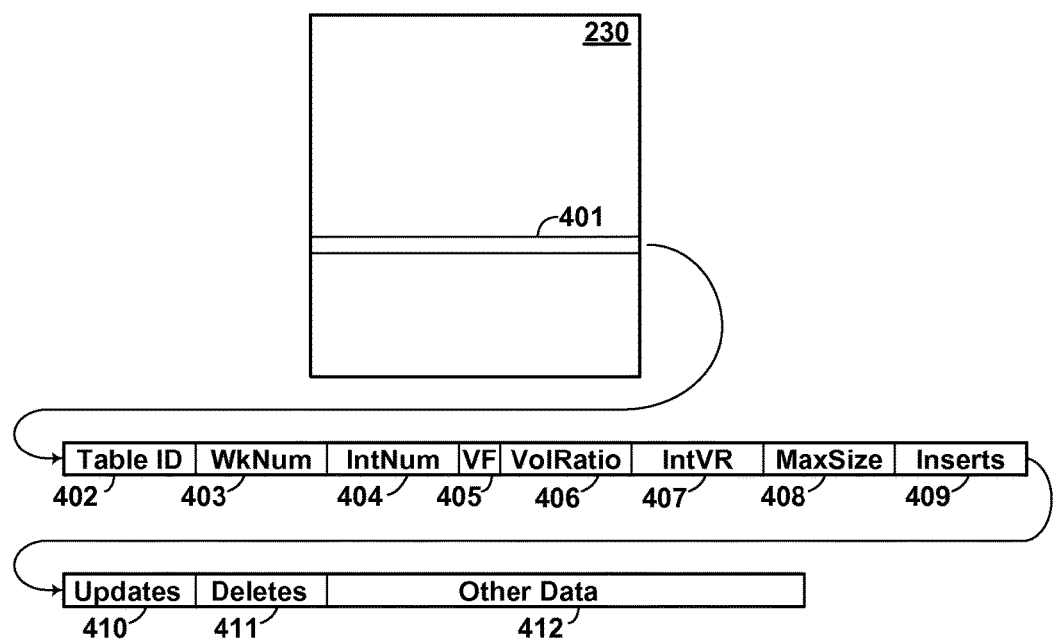
FIG. 4 is a conceptual representation of the structure of a volatility history record, according to the preferred embodiment.

FIG. 4 is a conceptual representation of the structure of a volatility history record 230, according to the preferred embodiment. Referring to FIG. 4, volatility history record 230 is preferably another database table having multiple entries 401, in which each entry corresponds to the volatility state of a particular database table for a particular time interval. Each entry 401 contains a table identifier 402 identifying the database table to which the entry pertains, and one or more time interval identifiers, represented in the exemplary entry of FIG. 4 as a week number 403 and an interval number 404. Week number 403 indicates the calendar week in which the sample data was taken, and interval number 404 indicates the number of the time interval within that week. The time interval might be the same as the sampling interval at which data is sampled and captured as described with respect to FIG. 5 below, or might be an aggregation of multiple sampling intervals. For example, where the sampling interval is one minute, the time interval might aggregate data over an hour to obtain a more long term picture of database characteristics, so that interval number 404 is an integer in the range of 1 to 168. Volatile flag 405 contains the state of volatile flag 309 at the end of the corresponding time interval, after the same has been updated at the end of the time interval based on data captured in the time interval. Volatility ratio 406 similarly contains the value of the volatility ratio 311, after the same has been updated at the end of the time interval. Interval volatility ratio 407 is a volatility ratio computed solely for the subject interval, without taking into account data from previous intervals. Maximum table size 408, number of inserts 409, number of updates 410 and number of deletes 412 represent the totals of these values (i.e., the values in fields 312-315, respectively) at the end of the subject time interval. The entry 401 may contain other data 412 useful to understanding the behavior of the subject table. As in the case of data in header 301, in one or more alternative embodiments there could be separate update counts for each field in the database and/or separate volatility ratios for different fields. Furthermore, volatility history record 230 could be subsumed in a larger record which generally records sampled data regarding the history of a database table, which may be useful for other purposes not related to the present invention.

Database manager 205 is executable computer programming code which executes on CPU 101 to provide basic functions for the management of database 203. Database manager 205 may theoretically support an arbitrary number of database tables, which may or may not have related information, although only three tables are shown in FIG. 2. Database manager 205 preferably contains administrative maintenance functions 206 allowing authorized users to perform basic administrative operations with respect to the database, such as defining and editing database table definitions, creating, editing and removing records in the database, viewing records in the database, defining database auxiliary data structures such as indexes and materialized query tables, views, and so forth. In particular, administrative maintenance functions 206 includes a volatility monitor 207 which maintains selective volatility data the database table header 301, and optionally in volatility history record 230, and infers the volatility of selective database tables from such data. Certain of these functions may be available only to system administrators and the like, while others are available to clients.

Database manager 205 preferably further includes a query engine 208 for executing queries against data in database tables 220-222 and a query optimizer 209 for generating optimized query execution plans for use by query engine 208 in executing queries. Database manager 205 further preferably includes an external interface 210 having one or more application programming interfaces (APIs) by which external applications can access data in database 203 either by invoking query engine 208 or through other means. Database manager 205 may further contain any of various more advanced database functions, as are known in the art. Database manager could be a generic database management system, such as one implementing a structured query language (SQL) query protocol, but it might alternatively query and structure data according to some other protocol and/or that it might be a custom designed database management system. Although database manager 205 is represented in FIG. 2 as an entity separate from operating system kernel 201, it will be understood that in some computer architectures various database management functions are integrated with the operating system.

Query optimizer 209 generates query execution strategies (also known as "plans", "access plans", "query plans" or "execution plans") for executing database queries. As is known in the database art, the amount of time or resource required to perform a complex query on a large database can vary greatly, depending on various factors, such as the availability of an index or other auxiliary data structure, the amount of resources required to evaluate each condition, and the expected selectivity (i.e., number of records eliminated from consideration) of the various logical conditions. Optimizer 209 determines an optimal execution strategy according to any optimizing algorithm, now known or hereafter developed, and generates an execution strategy according to the determination. The execution strategy is a defined series of steps for performing the query, and thus is, in effect, a computer program. The optimizer 209 which generates the execution strategy performs a function analogous to that of a compiler, although the execution strategy data is not necessarily executable-level code. It is, rather, a higher-level series of instructions which are understood and executed by the query engine 208.

The query optimizer 209 uses various metadata to predict the effectiveness of one or more alternative query execution strategies or sub-strategies, and selects an optimum strategy accordingly. The accuracy of these predictions, and the ultimate performance of execution strategies constructed by the query optimizer, is therefore dependent on the degree to which the metadata reflects the underlying reality of the database. For example, a histogram is typically constructed by sampling data in a database table at a particular time. If the histogram is not representative of the actual data in the table (either because the sampling was skewed for some reason, or because the data has significantly changed since the sample was collected), then the strategy which was constructed based on the assumed character of the table using the histogram may be less than optimal.

In one or more embodiments herein, the query optimizer 209 takes into account the volatility of the table or tables which are subject to a query when constructing an optimal query execution strategy for executing the query. This may be done in any of various ways. For example, because volatility indicates that information about the characteristics of a table may be unreliable, the optimizer may make "default" or "average" assumptions about a table's parameters (default or average size, cardinality, and so forth), rather than rely on information in the metadata. However, this example is not necessarily exhaustive, and any query optimization technique, now known or hereafter developed, which takes into account the volatility of a database table might be used by optimizer 209.

A query can be saved as a persistent storage object in memory, as represented in FIG. 2 as saved query objects 231-238, and can be written to disk or other storage. Once created by optimizer 209, a query execution strategy can be saved with the query as part of the persistent storage object. For a given query, it is possible to generate and save one, or optionally multiple, optimized execution strategies. The query can be invoked, and a saved query execution strategy re-used (re-executed), many times. For a frequently executed query, saving and re-using the query execution strategy can result in considerable performance enhancement. Although eight query objects are represented in FIG. 2, it will be understood that the actual number of such objects may vary. Although these are referred to herein as "query objects", the use of the term "object" is not meant to imply that database manager 205 or other components are necessarily programmed using so-called object-oriented programming techniques, or that the query object necessarily has the attributes of an object in an object-oriented programming environment.

Although one database 203 having three database tables 220-223 and eight auxiliary structures 223-230 are shown in FIG. 2, the number of such entities may vary, and could be much larger. Computer system 100 may contain multiple databases, each database may contain multiple tables, and each database may have associated with in multiple indexes, MQTs, histograms, views, volatility records, and/or other auxiliary data structures not illustrated. Alternatively, some entities represented in FIG. 2 might not be present in all databases. Additionally, database 203 may be logically part of a larger distributed database which is stored on multiple computer systems. Although database manager 205 is represented in FIG. 2 as part of database 203, the database manager, being executable code, is sometimes considered an entity separate from the "database", i.e., the data.

In addition to database management system 205, one or more user applications 211, 212 executing on CPU 101 may access data in database tables 220-222 to perform tasks on behalf of one or more users. Such user applications may include, e.g., sales transactions, inventory management, personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, on task may access data from a specific, known record, and optionally update it, while another task may invoke a query, in which all records in the database are matched to some specified search criteria, data from the matched records being returned, and optionally updated. Furthermore, data may be read from or written to database tables 220-222 directly, or may require manipulation or combination with other data supplied by a user, obtained from another database, or some other source. Applications 211-212 typically utilize function calls to database manager 205 through external APIs 210 to access data in database 203, and in particular, to execute queries against data in the database, although in some systems it may be possible to independently access data in database 203 directly from the application. One or more of applications 211-212 may function as a server acting on behalf of remote clients communicating with computer system 100 over a network. Although two applications 211, 212 are shown for illustrative purposes in FIG. 2, the number of such applications may vary.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIG. 2, it will be understood that the actual number of such entities may vary, and in particular, that in a complex database environment, the number and complexity of such entities is typically much larger. Additionally, although software components 203-238 are depicted in FIG. 2 on a single computer system 100 for completeness of the representation, it is not necessarily true that all programs, functions and data will be present on a single computer system or will be performed on a single computer system. For example, user applications which access the data base may be on a separate system from the database; the database may be distributed among multiple computer systems, so that queries against the database are transmitted to remote systems for resolution, and so forth.

While the software components of FIG. 2 are shown conceptually as residing in memory 102, it will be understood that in general the memory of a computer system will be too small to hold all programs and data simultaneously, and that information is typically stored in data storage, comprising one or more mass storage devices such as rotating magnetic disk drives 125-127, and that the information is paged into memory by the operating system kernel 201 as required. In particular, database tables 220-222 are typically too large to be completely loaded into memory, and typically only a portion of the total number of database records is loaded into memory at any one time. The full database 203 is typically recorded in disk storage 125-127. Furthermore, the conceptual memory representation of FIG. 2 might represent a single logical partition of a computer system having multiple logical partitions. Finally, it will be understood that the conceptual representation of FIG. 2 is not meant to imply any particular memory organizational model, and that system 100 might employ a single address space virtual memory, or might employ multiple virtual address spaces which overlap.

In the preferred embodiment, a volatility monitor function 207 within database manager 205 periodically automatically captures certain measures of table volatility over a sampling interval and computes a volatility ratio for the interval as an approximate measure of volatility. Values representing table volatility state are automatically updated based on these computations, so that the user is not required to manually determine and specify table volatility.

Table volatility state can be used in any manner now known or hereafter developed to improve system performance and understanding of the database. In particular, by way of example and not limitation, query optimizer 209 in the database manager may use the volatility state of a table to determine an optimum query execution strategy for a query involving data in the table. This could be done using any conventional technique now used for the SQL 'VOLATILE' attribute, or could use other techniques. For example, if a floating point volatility attribute is used, the query optimizer could take degree of volatility into account and weight this against other factors which may influence a determination for a particular search strategy. Furthermore, the database manager may take volatility state into account when determining whether to re-optimize a previously saved query execution strategy as a result of cumulative changes to the data. I.e., in certain database environments, queries are re-optimized (involving considerable overhead) if a table has undergone significant changes since the last optimization, such as the table size increasing by more than a pre-determined threshold. However, if a table is volatile, re-optimization in these circumstances could be prevented, to overly avoid frequent re-optimizations of saved queries and consequent overhead associated with those re-optimizations. In another example, a transition in volatility state (from volatile to non-volatile or vice-versa) might be used to trigger re-optimization of a saved query. As an additional alternative, the database manager may take the table volatility state into account when managing storage and retrieval of table data, for example by caching volatile table data, pinning volatile table data in memory and/or storing volatile table data in special storage areas or devices.

Figure 5A:
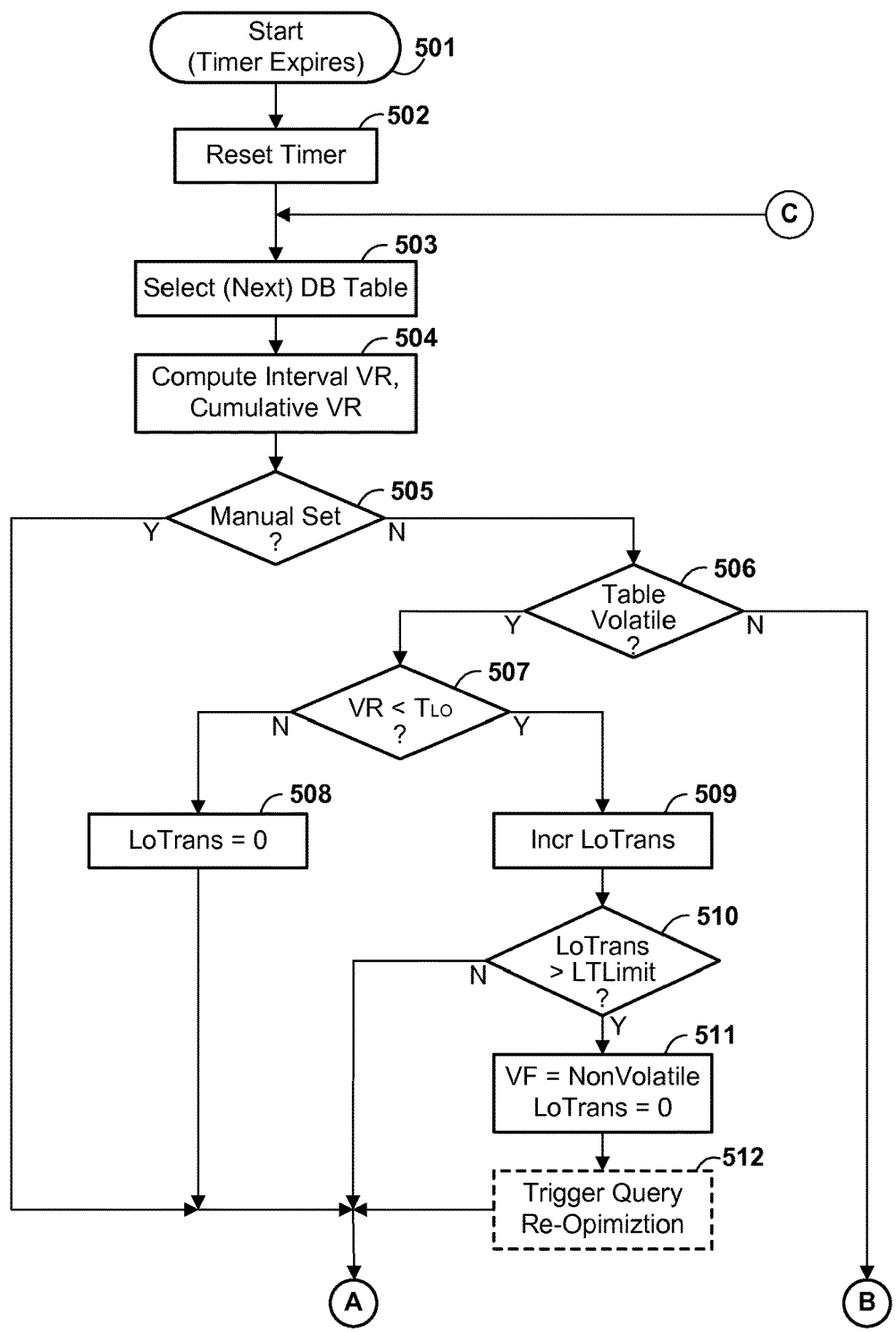
FIGS. 5A and 5B (herein collectively referred to as FIG. 5) are a flow diagram illustrating at a high level the process updating volatility state data at sampling intervals, according to the preferred embodiment.
Figure 5B:
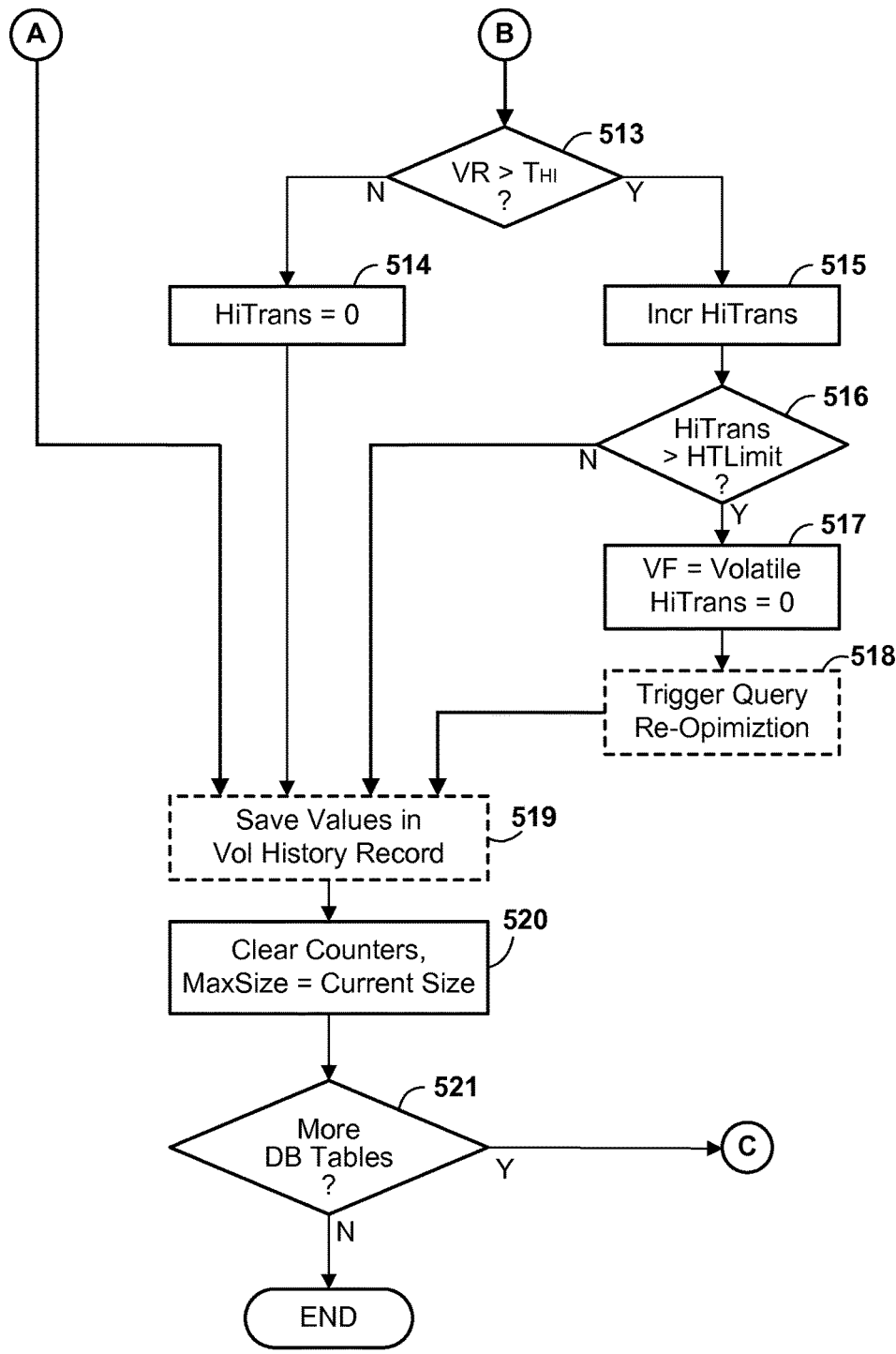

FIG. 5 is a flow diagram illustrating at a high level the process updating volatility state data at sampling intervals, according to the preferred embodiment. Referring to FIG. 5, the process is triggered by expiration of a sampling timer (block 501), which causes sampling data to be saved and volatility state updated. The sampling interval is preferably one minute, it being recognized that longer or shorter intervals could alternatively be used. Upon triggering volatility state update, the sampling timer is reset (block 502) to enable triggering the next sampling interval update.

A (next) database table 220-222 is selected for updating volatility state (block 503). A volatility ratio of the selected table in the sampling interval just concluded (the "interval volatility ratio") and a cumulative volatility ratio, representing a volatility ratio over time which is adjusted with each sampling interval, are computed (block 504).

The interval volatility ratio is computed as:

$$\text{IntervalVR}=[K_I^*(\text{Inserts})+K_U^*(\text{Updates})+K_D^*(\text{Deletes})]/\text{MaxSize}, \quad (1)$$

where Inserts, Updates, and Deletes are the number of record insert operation, update operations, and record delete operations, respectively, performed on the subject table during the sampling interval just concluded, MaxSize is the maximum size, in number of records, of the table during the sampling interval, and $K_I$, $K_U$ and $K_D$ are appropriately chosen coefficients. Inserts, Updates, Deletes and MaxSize are taken directly from the corresponding fields of header 301. The coefficients $K_I$, $K_U$ and $K_D$ could all be the same, but in the preferred embodiment are weighted differently. In general, Inserts and Deletes are weighted more heavily than Updates, and Inserts more heavily than Deletes. In a further alternative embodiment, some updates could be weighted more heavily than others. For example, updates that affect a key value could be weighted more heavily than updates which do not (this would require the maintenance of one more additional field (not shown) in header 301 to count updates affecting the key value). An exemplary set of coefficients might be, for example, 2.0 for Inserts, 0.9 for Deletes, 2.0 for updates that affect a key in an index, and 0.3 for other updates.

The value of an interval volatility ratio which might indicate a "volatile" table will depend on the database environment, but for a sampling interval of one minute, a volatility ratio of 0.1 or greater in a large table (e.g., more than 3000 records, or more than 5000 records) would typically indicate a volatile table. This threshold might be adjusted upward for relatively small tables. For example, for a table of 100 records a volatility ratio of 2 or greater might indicate volatility, and for a table of 1000 records a volatility ratio of 0.25 might indicate volatility. It will be understood that these values are merely representative examples, and could vary depending on many environmental factors. Furthermore, since the volatility ratio as described in formula (1) above involves a count of certain events taking place during the sampling interval, it will be expected that volatility ratio will vary with the length of the sampling interval.

In one or more variations, the interval volatility ratio is normalized to a floating point value between 0 and 1. For example, interval volatility ratio may be normalized according to:

$$\text{IntervalVR(Normalized)}=\text{IntervalVR}/(\text{IntervalVR}+M), \quad (2)$$

where M is an appropriately chosen mid-point value yielding a normalized IntervalVR of 0.5. For example, M might equal 0.1 (for a large table and a one minute sampling interval, as discussed above. It will be appreciated that any of various alternative normalization formulae could be used.

Since it is expected that there will be some variation in database activity, volatility is preferably determined based on data from multiple recent intervals. This could be done in any number of ways. For example, if more than half (or some other percentage) of a set of recent intervals (e.g., the last 30 one-minute intervals) have interval volatility ratios exceeding a threshold, then the table might be considered volatile. Alternatively, if some number of consecutive recent intervals have volatility ratios exceeding a threshold, then the table might be considered volatile. To avoid excessive oscillation between a volatile and non-volatile state, a first threshold may be used for switching from non-volatile to volatile, and a second, lower, threshold may be used for switching from volatile to non-volatile.

In one or more embodiments, a cumulative volatility ratio, representing a form of average of recent intervals, is computed from the interval volatility ratios (as described in formula (1) or (2) above), adjusted after each interval as follows:

$$\text{CumVRNew}=(1-tv)^*\text{CumVROld}+tv^*\text{IntervalVR}, \quad (3)$$

where CumVRNew is the new cumulative volatility ratio (after adjustment), CumVROld is the previous cumulative volatility ratio (before adjustment), and tv is an appropriately chosen time constant of volatility between 0 and 1, used to average the IntervalVR just computed and the old cumulative volatility ratio. The time constant of volatility controls the rate at which volatility from previous intervals is aged, a larger value of tc resulting in faster aging of data. If the Interval VR is normalized, then the normalized value of IntervalVR is used in the above equation to generate a normalized cumulative volatility ratio.

The volatility ratios as herein described are intended as a relatively simple measure of table volatility, which can be computed using numerical inputs which are either already likely to be available or are relatively easy to obtain, e.g. by counting certain events. It will be appreciated that any of various alternative techniques utilizing alternative inputs could be used. For example, rather than be based on a single formula which computes a volatility ratio or other figure of merit, volatility may be determined by making a set of comparisons of measured or derived values to pre-determined thresholds. Other or additional inputs may be used; for example, a difference between the maximum size of the table and the minimum size of the table in the sampling interval could be considered.

As a further alternative, a volatility ratio or other figure of merit or technique for determining volatility could be applied separately to each partition 302 or a partitioned database table. In accordance with this further alternative, sampling data such as a number of inserts, updates, and deletes, a maximum size, and so forth, could be maintained separately for each partition, and the volatility ratio computed accordingly. The query optimizer 209 could then optimize a query separately for different partitions of the table, i.e., construct an optimized query strategy for the volatile partitions and a separate optimized query strategy for the non-volatile partitions. If the parameters of a single instance of the query span both volatile and non-volatile partitions, the query engine 208 would execute each optimized query strategy for the respective partitions to which it applies, and form a union of the results.

As a further alternative, a volatility ratio or other figure of merit may be based on a number of bytes inserted, changed, or deleted, rather than a number of insert, update or delete operations, either alone or in combination with other factors. For example, if the database contains a large object (LOB) column, such as a binary large object (BLOB) or a character based large object (CLOB), and the sizes of the entries varies drastically between inserts, updates and deletes, that table may be considered volatile even though the number of records changed may not be extraordinary. For example, a volatility ratio may be a number of bytes inserted+updated+deleted divided by a maximum table byte size, or the number of bytes inserted, updated and deleted, multiplied by a suitable coefficient $K_B$, may be an additional term in the volatility ratio computed as described in formula (1) above.

Furthermore, a figure of merit for volatility, such as a volatility ratio, could take into account the variation in system workload which typically occurs at different days and times. For example, volatility ratio might only be computed for peak times, so that very low volatility occurring when the system is lightly used is not taken into account. The volatility might be additionally normalized based on average number of transactions occurring per unit time, or some other measure of activity. Finally, extremely high volatility occurring during an interval in which a database is being initially loaded, copied, or populated with data might be ignored for purposes of determining volatility.

If the manual set flag 310 in table header 301 is true, then the 'Y' branch is taken from block 505, and blocks 506-518 are by-passed. In this case, the manual set flag indicates that the user will manually set the volatile flag, and the database manager therefore does not alter it. It will be noted, however, that the database manager still computes and saves the volatility ratios (as described above), since this data may be useful for later performance analysis or if the user should decide to activate automated setting of volatility state. If manual set flag 310 is false, the 'N' branch is taken from block 505 to block 506.

If the subject database table is currently considered 'volatile', i.e. the volatile flag 309 in header 301 is set to 'volatile', then the 'Y' branch is taken from block 506. In this case, the volatility monitor considers whether the volatile flag should be changed. The volatile flag will be switched to a 'non-volatile' state if the volatility ratio or other measure of volatility remains below a pre-determined low threshold ($T_{LO}$) for more than a pre-determined number of sampling intervals (LTLimit). In one or more embodiments, this volatility ratio is the cumulative volatility ratio computed according to formula (3); in other embodiments, it may be the interval volatility ratio according to either formula (1) or (2); in still other embodiments, it might be some other measure of volatility. Referring to FIG. 5, if the volatility ratio or other measure of volatility, as described above, is not below the low threshold $T_{LO}$, then the 'N' branch is taken from block 507, and a counter LoTrans, which counts the number of consecutive sampling intervals in which the volatility ratio or other measure of volatility remains below the low threshold $T_{LO}$, is reset to 0 (block 508). If, at block 507, the volatility ratio or other measure of volatility is below $T_{LO}$, then the 'Y' branch is taken from block 507, and the counter LoTrans is incremented by one (block 509). The counter LoTrans is then compared with the limit LTLimit (block 510). If the counter LoTrans does not exceed the limit LTLimit, the 'N' branch is taken from block 510, skipping blocks 511-512. If the counter LoTrans exceeds the limit LTLimit, then the state of the volatile flag is switched to 'non-volatile', and the counter LoTrans is reset to 0 (block 511). The change in volatility state could optionally be cause for triggering re-optimization of saved query strategies which reference data in the subject database table, represented as block 512 in dashed lines. Program flow then continues to block 519, where state values are saved.

If, at block 506, the subject database table is not currently considered 'volatile', i.e. the volatile flag 309 in header 301 is set to 'non-volatile', then the 'N' branch is taken from block 506. In this case, the volatility monitor considers whether the volatile flag should be changed to 'volatile'. The volatile flag will be switched to a 'volatile' state if the volatility ratio or other measure of volatility, as described above, remains above a pre-determined high threshold ($T_{HI}$) for more than a pre-determined number of sampling intervals (HTLimit). Referring to FIG. 5, if the volatility ratio or other measure of volatility is not above the high threshold $T_{HI}$, then the 'N' branch is taken from block 513, and a counter HiTrans, which counts the number of consecutive sampling intervals in which the volatility ratio or other measure of volatility remains above the high threshold $T_{HI}$, is reset to 0 (block 514). If, at block 513, the volatility ratio or other measure of volatility is above $T_{HI}$, then the 'Y' branch is taken from block 513, and the counter HiTrans is incremented by one (block 515). The counter HiTrans is then compared with the limit HTLimit (block 516). If the counter HiTrans does not exceed the limit HTLimit, the 'N' branch is taken from block 516, skipping blocks 517-518. If the counter HiTrans exceeds the limit HTLimit, then the state of the volatile flag is switched to 'volatile', and the counter HiTrans is reset to 0 (block 517). The change in volatility state could optionally be cause for triggering re-optimization of saved query strategies which reference data in the subject database table, represented as block 518 in dashed lines. Program flow then continues to block 519, where state values are saved.

While it would be possible to set $T_{LO}=T_{HI}$ and LTLimit=HTLimit=0, in the preferred embodiment $T_{LO}<T_{HI}$ and both LTLimit and HTLimit are greater that zero to reduce oscillation between the volatile and non-volatile state where table volatility hovers in the middle of the range.

After making any required state changes to the volatile flag, the sampled and calculated values for the sampling interval just concluded are saved in volatility history record 230 (block 519), i.e. the entry 401 in volatility history record 230 is updated with event counts and so forth from the sampling interval just concluded, or if necessary an new entry 401 is created in the volatility history record table and populated with data from the sampling interval. In this case, the interval volatility ratio 407 could be the interval volatility ratio for the sampling interval just concluded, plus any other included sampling intervals, computed as described above in formula (1) or (2), and the volatility ratio 406 could be the cumulative volatility ratio adjusted as described above by interval volatility ratio. Block 519 is shown in dashed lines to indicate that this step is only performed if optional volatility history record 230 is maintained.

The volatility monitor then clears the counters for inserts 315, updates 316, and deletes 317 in table header 301, and initializes MaxSize 314 to the current size of the subject database table (block 520). If more database tables remain to be processed, the 'Y' branch is taken from block 521, and a next database table is selected for processing at block 503. When all database tables have been processed for the sampling interval just concluded, the 'N' branch is taken from block 521, and the process of updating volatility state data at sampling intervals goes to sleep until the timer expires again.

Figure 6:
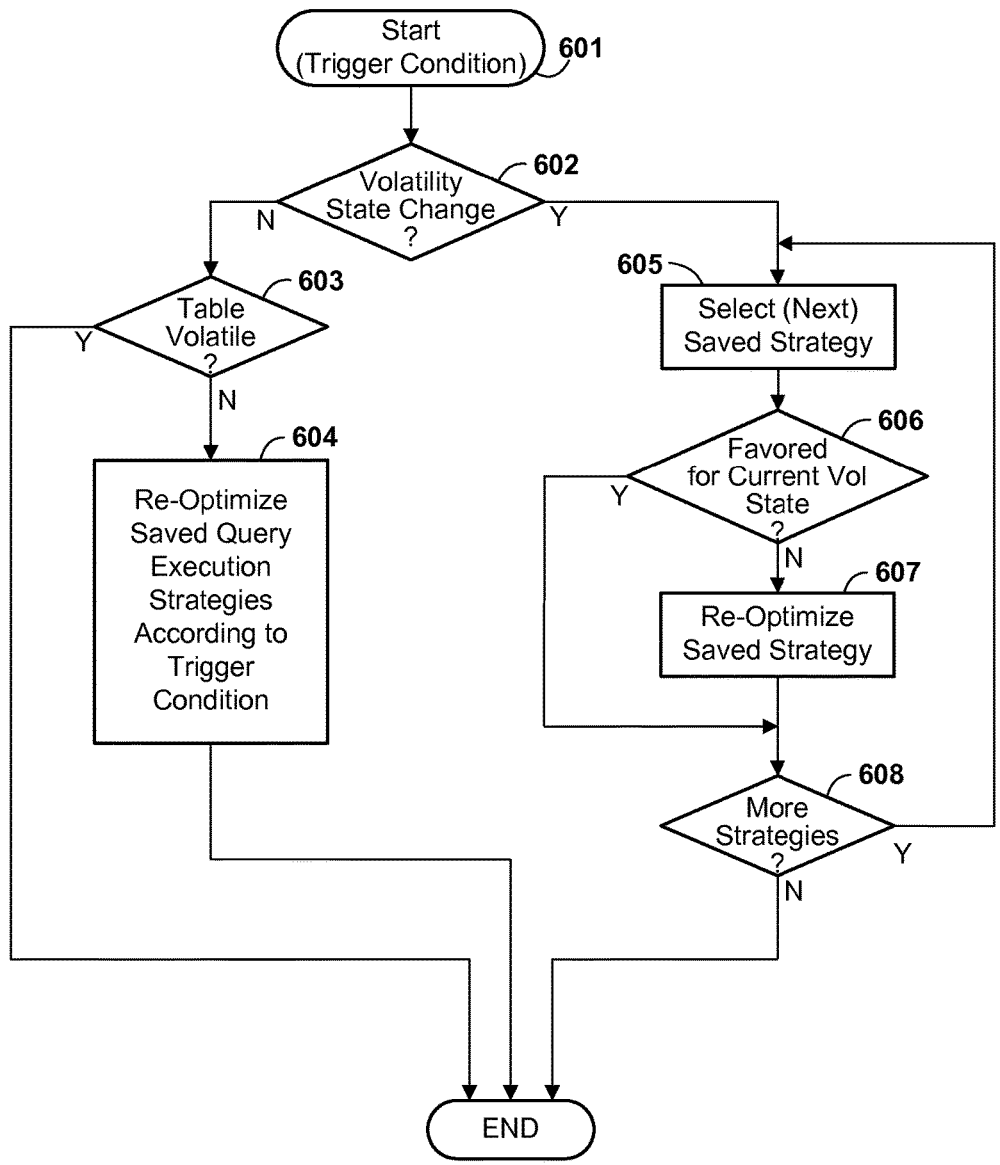
FIG. 6 is a flow diagram illustrating at a high level the process re-optimizing saved query execution strategies responsive to a detected trigger condition.

As explained previously, among the possible ways in which a volatility attribute may be used is to determine conditions under which previously saved query execution strategies might be re-optimized. FIG. 6 is a flow diagram illustrating at a high level the process re-optimizing saved query execution strategies responsive to a detected trigger condition.

Referring to FIG. 6, a trigger condition with respect to a particular database table is detected to begin the process (block 601). The trigger condition could be any of various trigger conditions known in the art or hereafter developed for triggering re-optimization of saved query execution strategies. For example, a trigger condition may involve cumulative changes to a database table since a previous re-optimization, such as the table increasing or decreasing in size by more than a predetermined amount, or a predetermined proportion of the records in the table being altered. A trigger condition may further involve the elapse of time since a previous re-optimization. A trigger condition may further be based on the addition of a metadata structure, such as an index, to the metadata maintained by the database manager. Furthermore, a trigger condition does not necessarily cause re-optimization immediately; the re-optimization process may be delayed until a time of low system activity following the occurrence of the trigger condition. In one or more embodiments, one of the trigger conditions is a change of state of the volatile flag 309 in header 301 of the subject database table, as performed at blocks 512 or 518 of FIG. 5.

If the trigger condition was other than a change of state of the volatile flag 309, the 'N' branch is taken from block 602. In this case, if the table is in a volatile state as indicated by the volatile flag, the 'Y' branch is taken from block 603, and no re-optimization is performed. Re-optimization is preferably disabled when the table is consistently volatile because volatile table tend to overly frequently invoke the trigger conditions. It would alternatively be possible to re-optimize even a volatile table for some trigger conditions but not others (not shown). If the table is not in a volatile state, the 'N' branch is taken from block 603, and the saved query execution strategies against data in the subject table are re-optimized (block 604). Re-optimization performed at block 604 may use any known or hereafter developed technique, may depend on the nature of the trigger, and would not necessarily involve all saved query execution strategies.

If the trigger condition was a change of state of the volatile flag, the 'Y' branch is taken from block 602. A saved query execution strategy for the subject database table is selected for re-optimization (block 605). If the selected query execution strategy uses a technique for searching the subject database table which is favored by the current volatility state, then the 'Y' branch is taken from block 606, and re-optimization is by-passed; if not, the 'N' branch is taken, and the selected query execution strategy is re-optimized (block 607). Each volatility state ('volatile' or 'non-volatile') will favor a respective form of search for the table, such as a table scan vs. an index scan. "Favor" does not require an absolute preference for one form of search over another, but only means that a particular form of search will be selected in more circumstances than would be the case if the volatility state were otherwise. If the saved query execution strategy already uses the favored form of search, notwithstanding that it was necessarily constructed before the change of volatility state, then re-optimization is unlikely to produce significant benefit, and re-optimization may be by-passed.

If more saved strategies remain to be examined, the 'Y' branch is taken from block 608 and a next saved strategy is selected at block 605. When all saved strategies have been examined, the 'N' branch is taken from block 608 and the re-optimization process ends.

Although a series of steps has been described above as a preferred embodiment, it will be appreciated that many variations of processes for monitoring and determining volatility of a database table are possible. In particular, some steps may be performed in a different order, different data structures may be used, and/or different hardware or software resources may be employed to perform functions described herein. Furthermore, although certain formulae and variations thereof have been disclosed herein for computing volatility ratio and making inferences of table volatility therefrom, it will be appreciated that these formulae and variations thereof are only some of the possible embodiments of a system which automatically determines table volatility from monitoring data, and that other formulae involving the same or different inputs could alternatively be used.

In the preferred embodiment described above, re-optimization of a query strategy is prevented, restricted or otherwise limited if the query references a volatile table. This is generally deemed desirable to avoid the overhead associated with frequent query re-optimization. However, in one or more alternative embodiments, re-optimization may be more likely for some types of queries and/or certain database environments if the table is volatile. For example, if the cost of re-optimization is relatively small in relation to the cost of execution, it may be desirable to re-optimize more frequently where the table is volatile.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Examples of a computer readable storage medium are illustrated in FIG. 3 as system memory 302 and data storage devices 325-327. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Unless inconsistent with the invention or otherwise qualified herein, computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A computer program product, comprising a plurality of computer-executable instructions recorded in a non-transitory computer-readable media, wherein said instructions, when executed by at least one computer system, cause the computer system to perform:

monitoring at least one parameter of a database table of said computerized database over at least one time interval and saving monitored parameter data with respect to said database table;

determining a database table volatility state of said database table using the saved monitored parameter data, said database table volatility state being a property of said database table that is a function of changes to data recorded in said database table with respect to time, said database table volatility state being independent of any queries against data in said database table; and responsive to determining a database table volatility state of said database table using the saved monitored parameter data, generating and saving at least one database table volatility attribute expressing the database table volatility state of said database table, said at least one volatility attribute being used by a process executing on the at least one computer system to manage access to data in said database table, wherein said at least one volatility attribute is used to manage access to data in said database table by at least one of: (a) using said at least one volatility attribute to determine an optimum query execution strategy for a query against data in said database table, (b) using said at least one volatility attribute to determine whether to re-optimize a previously saved query execution strategy for a query against data in said database table, (c) using said at least one volatility attribute to determine whether to collect statistical data regarding said database table, and (d) using said at least one volatility attribute to manage storage and/or retrieval of data in said at least one database table.

2. The computer program product of claim 1, wherein said computerized database supports the SQL database language and said at least volatility attribute comprises an SQL VOLATILE attribute.

3. The computer program product of claim 1, wherein said volatility attribute comprises a numerical value within a range.

4. The computer program product of claim 1, wherein said determining a database table volatility state of said database table using the saved monitored parameter data comprises computing a figure of merit representing volatility, said figure of merit using at least one of: (a) a number of insert operations performed on the database table; (b) a number of update operations performed on the database table; (c) a number of delete operations performed on the database table; (d) a size of the database table; (e) a change in size of the database table; and (f) a number of bytes altered in the database table.

5. The computer program product of claim 1,
wherein said monitoring at least one parameter of a database table of said computerized database over at least one time interval and saving monitored parameter data with respect to said database table comprises saving respective monitored parameter data with respect to each of a plurality of consecutive time intervals; and
wherein said determining a database table volatility state of said database table using the saved monitored parameter data comprises determining a database table volatility state of said database table using respective saved monitored parameter data from a plurality recent consecutive time intervals.

6. The computer program product of claim 5, wherein said determining a database table volatility state of said database table using respective saved monitored parameter data from a plurality recent consecutive time intervals comprises computing a respective figure of merit representing volatility of said database table for each of the plurality of recent consecutive time intervals.

7. The computer program product of claim 1,
wherein said instructions, when executed by the at least one computer system, further cause the computer system to receive a user input specifying whether database table volatility state of said database table is to be manually specified or automatically determined by said at least one computer system;
wherein said determining a database table volatility state of said database table using the saved monitored parameter data and said generating and saving at least one volatility attribute expressing volatility of said database table are not performed if said user input specifies that the volatility state of said database table is to be manually specified.

8. A database manager computer program product, comprising a plurality of computer-executable instructions recorded in a non-transitory computer-readable media, wherein said instructions comprise:
at least one data management function for performing at least one of adding data to, removing data from, or editing data in, one or more structured database tables managed by said database manager;
a query engine for executing queries against data in said one or more structured database tables;
a volatility monitoring function which determines a respective database table volatility state of at least one database table of said one or more structured database tables using saved monitored parameter data with respect to the respective database table and generates and saves at least one volatility attribute of the respective database table expressing the respective database table volatility of the respective database table responsive to determining the respective database table volatility state, the respective database table volatility state of each said database table being a property of the respective database table that is a function of changes to data contained in the respective database table with respect to time, the respective database table volatility state being independent of any queries against data in the respective database table; and
wherein said database manager uses said at least one volatility attribute to manage access to data in said one or more structured database tables by at least one of: (a) using said at least one volatility attribute to determine an optimum query execution strategy for a query against data in said database table, (b) using said at least one volatility attribute to determine whether to re-optimize a previously saved query execution strategy for a query against data in said database table, (c) using said at least one volatility attribute to determine whether to collect statistical data regarding said database table, and (d) using said at least one volatility attribute to manage storage and/or retrieval of data in said at least one database table.

9. The database manager computer program product of claim 8, wherein said database manager supports the SQL database language and said at least volatility attribute comprises an SQL VOLATILE attribute.

10. The database manager computer program product of claim 8, further comprising:
a query optimizer for generating optimized query execution plans for use by said query engine in executing queries, wherein said query optimizer uses said at least one volatility attribute to generate optimized query execution plans.

11. The database manager computer program product of claim 8, wherein said volatility attribute comprises a numerical value within a range.

12. The database manager computer program product of claim 8, wherein said volatility monitoring function determines a respective database table volatility state of at least one database table by computing a respective figure of merit representing volatility, each respective figure of merit using at least one of: (a) a number of insert operations performed on the respective database table; (b) a number of update operations performed on the respective database table; (c) a number of delete operations performed on the respective database table; (d) a size of the respective database table; (e) a change in size of the respective database table; and (f) a number of bytes altered in the respective database table.

13. The database manager computer program product of claim 8,
wherein said monitored parameter data comprises respective monitored parameter data with respect to each database table collected in each of a plurality of consecutive time intervals; and
wherein said volatility monitoring function determines the respective database table volatility state of each database table using respective saved monitored parameter data from a plurality recent consecutive time intervals.

14. A computer system supporting a database, comprising:
a memory;
at least one processor, said at least one processor executing instructions storable in said memory;
a database table of said database storable in said memory;
a database manager embodied as instructions storable in said memory and executable on said at least one processor, said database manager managing said database and providing access to data in said database table;
said database manager including a volatility monitoring function which determines a database table volatility state of said database table using saved monitored parameter data with respect to said database table and generates and saves at least one volatility attribute of said database table expressing volatility of said database table responsive to determining the database table volatility state, the database table volatility state of said database table being a property of
the database table that is a function of changes to the database table with respect to time, independent of any queries against data in the database table; and
wherein said database manager uses said at least one volatility attribute to manage access to data in said database table by at least one of: (a) using said at least one volatility attribute to determine an optimum query execution strategy for a query against data in said database table, (b) using said at least one volatility attribute to determine whether to re-optimize a previously saved query execution strategy for a query against data in said database table, (c) using said at least one volatility attribute to determine whether to collect statistical data regarding said database table, and (d) using said at least one volatility attribute to manage storage and/or retrieval of data in said at least one database table.

15. The computer system of claim 14, wherein said database supports the SQL database language and said at least volatility attribute comprises an SQL VOLATILE attribute.

16. The computer system of claim 14, wherein said volatility attribute comprises a numerical value within a range.

17. The computer system of claim 14, wherein said volatility monitoring function determines said database table volatility state of said database table by computing a figure of merit representing volatility, said figure of merit using at least one of: (a) a number of insert operations performed on the database table; (b) a number of update operations performed on the database table; (c) a number of delete operations performed on the database table; (d) a size of the database table; (e) a change in size of the database table; and (f) a number of bytes altered in the database table.

18. The computer system of claim 14,
wherein said monitored parameter data comprises respective monitored parameter data with respect to said database table collected in each of a plurality of consecutive time intervals; and
wherein said volatility monitoring function determines said database table volatility state of said database table using respective saved monitored parameter data from a plurality recent consecutive time intervals.

* * * * *